(12) United States Patent
Kurokawa

(10) Patent No.: US 9,452,781 B2
(45) Date of Patent: Sep. 27, 2016

(54) VEHICLE FRAMEWORK STRUCTURE

(71) Applicant: TOYOTA JIDOSHA KABUSHIKI KAISHA, Toyota-shi (JP)

(72) Inventor: Hiroyuki Kurokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/903,534

(22) PCT Filed: Jun. 18, 2014

(86) PCT No.: PCT/JP2014/066212
§ 371 (c)(1),
(2) Date: Jan. 7, 2016

(87) PCT Pub. No.: WO2015/019720
PCT Pub. Date: Feb. 12, 2015

(65) Prior Publication Data
US 2016/0152271 A1   Jun. 2, 2016

(30) Foreign Application Priority Data

Aug. 8, 2013   (JP) .................................. 2013-165432

(51) Int. Cl.
*B60K 37/00*   (2006.01)
*B62D 21/02*   (2006.01)
*B62D 25/20*   (2006.01)

(52) U.S. Cl.
CPC ........... *B62D 21/02* (2013.01); *B62D 25/2009* (2013.01)

(58) Field of Classification Search
CPC ............................ B62D 21/02; B62D 25/2009
See application file for complete search history.

(56) References Cited

U.S. PATENT DOCUMENTS

| 5,242,209 A * | 9/1993 | Yamauchi | B62D 25/04 |
| | | | 296/187.12 |
| 6,073,992 A * | 6/2000 | Yamauchi | B62D 23/00 |
| | | | 296/187.12 |

(Continued)

FOREIGN PATENT DOCUMENTS

| JP | 11-48780 | 2/1999 |
| JP | 2008-126835 A | 6/2008 |

(Continued)

OTHER PUBLICATIONS

International Search Report Issued Sep. 16, 2014 in PCT/JP14/66212 Filed Jun. 18, 2014.

*Primary Examiner* — Lori L Lyjak
(74) *Attorney, Agent, or Firm* — Oblon, McClelland, Maier & Neustadt, L.L.P.

(57) ABSTRACT

A vehicle framework member is provided with a framework member, a reinforcing member and a connecting plate. The framework member has a closed cross section structure including plural wall portions structuring a framework of a vehicle. The framework member includes an inflection portion that is inflected at a portion partway along a length direction. The reinforcing member is fabricated of fiber-reinforced resin and includes a pair of side walls formed in inflected flat plate shapes along the inflection portion. The reinforcing member is disposed in the closed cross section structure at the inflection portion of the framework member. The connecting plate connects the pair of side walls of the reinforcing member and connects a compression deformation side wall portion of the inflection portion with an extension deformation side wall portion of the inflection portion.

6 Claims, 5 Drawing Sheets

(56) References Cited

U.S. PATENT DOCUMENTS 6,082,811 A 7/2000 Yoshida
8,668,250 B2 * 3/2014 Klimek .................. B62D 25/04
296/193.05

FOREIGN PATENT DOCUMENTS

| JP | 2008-267393 A | 11/2008 |
|----|---------------|---------|
| JP | 5768838 | 8/2015 |

* cited by examiner

VEHICLE FRAMEWORK STRUCTURE

TECHNICAL FIELD

The present invention relates to a vehicle framework structure.

BACKGROUND ART

A vehicle framework member structure has been known since heretofore (for example, see Japanese Patent Application Laid-Open (JP-A) No. 2008-126835) in which an internal framework member with a closed cross section structure is disposed at an inflected portion of a vehicle framework member with a closed cross section structure so as to suppress bending deformation that is caused at the inflected portion by input of a load.

SUMMARY OF INVENTION

Technical Problem

However, there is still scope for improvement in a structure that suppresses the bending deformation that is caused at an inflected portion of a vehicle framework member by input of a load.

Accordingly, an object of the present invention is to provide a vehicle framework structure that may suppress bending deformation that is caused at a framework member by input of a load.

Solution to Problem

In order to achieve the object described above, a vehicle framework member of a first aspect relating to the present invention includes: a framework member with a closed cross section structure including a plurality of wall portions that structure a framework of a vehicle, the framework member including an inflection portion that is inflected or curved at a portion partway along a length direction of the framework member; and a reinforcing member fabricated of fiber-reinforced resin, the reinforcing member being disposed in the closed cross section structure at the inflection portion of the framework member, the reinforcing member including: a pair of side walls formed in inflected flat plate shapes or curved flat plate shapes along the inflection portion; a connecting plate that connects the pair of side walls of the reinforcing member and that connects a compression deformation side wall portion of the inflection portion with an extension deformation side wall portion of the inflection portion; and at least one partition wall that connects the pair of side walls and is disposed at an angle intersecting the connecting plate.

According to the first aspect relating to the present invention, the reinforcing member is disposed inside the closed cross section structure at the inflection portion of the framework member, and the connecting plate that connects the pair of side walls of the reinforcing member connects the wall portion at the compression deformation side of the inflection portion with the wall portion at the extension deformation side of the inflection portion. Therefore, if a force that causes bending deformation (a bending moment) is inputted to the inflection portion of the framework member, the bending deformation force can be dispersed by the connecting plate of the reinforcing member. As a result, bending deformation that occurs at the inflection portion of the framework member can be suppressed.

In a vehicle framework member of the first aspect relating to the present invention, the reinforcing member includes at least one partition wall that connects the pair of side walls and is disposed at an angle intersecting the connecting plate.

According to the first aspect relating to the present invention, each of the single or plural partition wall(s) that connect(s) the pair of side walls of the reinforcing member is arranged at an angle that intersects the connecting plate. Therefore, the strength (stiffness) of the reinforcing member is improved compared to a case in which the reinforcing member does not include the partition walls.

In a vehicle framework member of a second aspect relating to the present invention, in the vehicle framework member of the first aspect, the at least one partition wall is provided at a maximum inflection portion or a maximum curvature portion of the inflection portion.

According to the second aspect relating to the present invention, a partition wall is provided at the maximum inflection portion or maximum curvature portion of the inflection portion. Therefore, the strength (stiffness) of the reinforcing member is further improved compared to a case in which the partition wall is not provided at the maximum inflection portion or the maximum curvature portion of the inflection portion.

In a vehicle framework member of a third aspect relating to the present invention, in the vehicle framework member of the first aspect or the second aspect, the at least one partition wall is provided at one length direction end portion side of the side walls.

According to the third aspect relating to the present invention, a partition wall is provided at the one length direction end portion side of the side walls. Therefore, the strength (stiffness) of the reinforcing member is further improved compared to a case in which the partition wall is not provided at the one length direction end portion side of the side walls.

In a vehicle framework member of a fourth aspect relating to the present invention, in the vehicle framework member of any of the first to third aspects, an orientation of fibers in the connecting plate is along an extension direction of the connecting plate.

According to the fourth aspect relating to the present invention, the orientation of the fibers in the connecting plate is along the extension direction of the connecting plate. Therefore, the strength (stiffness) of the connecting plate is improved compared to a case in which the orientation of fibers in the connecting plate is not along the extension direction of the connecting plate.

In a vehicle framework member of a fifth aspect relating to the present invention, in the vehicle framework member of any of the first to fourth aspects, an orientation of fibers in each of the side walls is parallel to an imaginary straight line joining one length direction end portion of the side wall at the extension deformation side wall portion with another length direction end portion of the side wall.

According to the fifth aspect relating to the present invention, the orientation of the fibers in the side walls is parallel to the imaginary straight line joining the one length direction end portion with the another end portion along the wall portion at the extension deformation side of each side wall. Therefore, the strength (stiffness) of the side walls is improved compared to a case in which the orientation of fibers in the side walls is not parallel with this imaginary straight line.

Advantageous Effects of Invention

As described hereabove, according to the first aspect relating to the present invention, bending deformation that is caused at the framework member by the input of a load may be suppressed.

According to the first aspect relating to the present invention, the strength of the reinforcing member may be improved.

According to the second aspect relating to the present invention, the strength of the reinforcing member may be further improved.

According to the third aspect relating to the present invention, the strength of the reinforcing member may be further improved.

According to the fourth aspect relating to the present invention, the strength of the connecting plate may be improved.

According to the fifth aspect relating to the present invention, the strength of the side walls may be improved.

DESCRIPTION OF EMBODIMENTS

Figure 1:
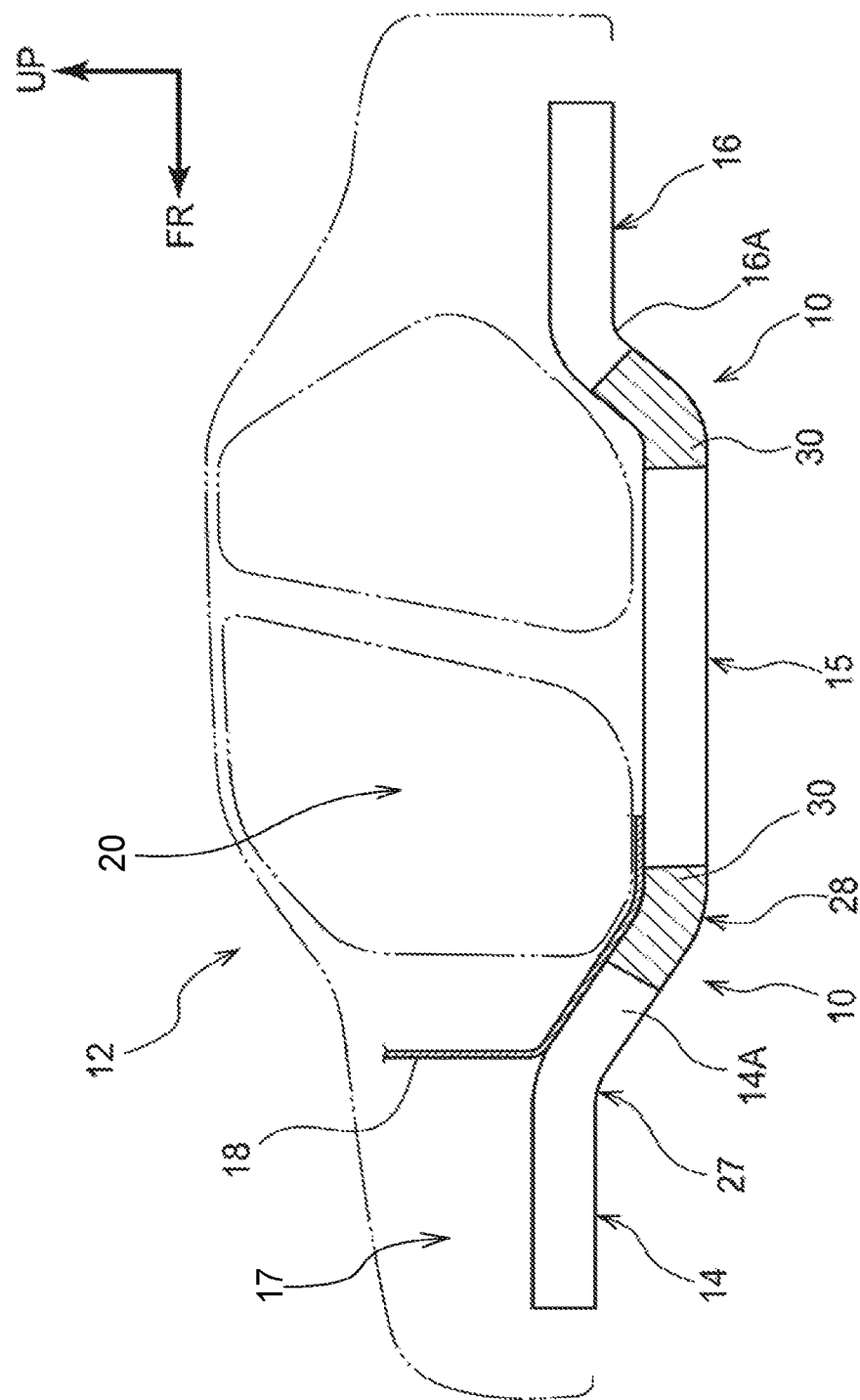
FIG. 1 is a side view showing schematic structures of a vehicle framework structure in accordance with a present exemplary embodiment.

Herebelow, an exemplary embodiment of the present invention is described in detail in accordance with the drawings. For convenience of description, the arrow UP that is shown where appropriate in the drawings indicates a vehicle body upper direction, the arrow FR indicates a vehicle body front direction, and the arrow OUT indicates a vehicle width direction outer side. In the following descriptions, where the directions up, down, front, rear, left and right are used without being particularly specified, the same represent up and down in the vehicle body up-and-down direction, the front and rear in the vehicle body front-and-rear direction, and left and right in the vehicle body left-and-right direction (the vehicle width direction). FIG. 1 shows the left side of a vehicle 12 equipped with a framework member 10 according to the present exemplary embodiment. The right side of the vehicle 12 is the same, subject to left-right symmetry.

As shown in FIG. 1, a pair of left and right front side members 14 are disposed at each of two side portions of a front portion of the vehicle 12. Each front side member 14 serves as a framework member with a closed cross section structure, a length direction of which is in the vehicle body front-and-rear direction. A tilt portion (a kick portion) 14A is formed partway along the length direction of the front side member 14. The front side member 14 extends in the vehicle body front-and-rear direction with the vehicle body front side thereof relative to the tilt portion 14A at a position (an elevation) that is higher by a predetermined height than the vehicle body rear side thereof.

A pair of left and right rear floor side members 16 are disposed at each of two side portions of a rear portion of the vehicle 12. Each rear floor side member 16 serves as a framework member with a closed cross section structure, a length direction of which is in the vehicle body front-and-rear direction. A tilt portion (a kick portion) 16A is formed partway along the length direction of the rear floor side member 16. The rear floor side member 16 extends in the vehicle body front-and-rear direction with the vehicle body rear side thereof relative to the tilt portion 16A at a position (an elevation) that is higher by a predetermined height than the vehicle body front side thereof.

The front side member 14 and rear floor side member 16 are integrally formed, being connected via a floor member 15 that serves as a framework member with a closed cross section structure that extends in the vehicle body front-and-rear direction. The framework member 10 of the vehicle 12 at the rear floor side member 16 side is the same as the framework member 10 of the vehicle 12 at the front side member 14 side. Below, the framework member 10 of the vehicle 12 at the front side member 14 side is described.

As shown in FIG. 1, a substantially flat board-shaped dash panel 18 is provided in the vehicle 12. The dash panel 18 extends along an upper face of the tilt portion 14A of the front side member 14. The dash panel 18 also extends toward the vehicle body upper side from a front end portion of the tilt portion 14A and serves as a wall portion that divides an engine compartment 17 from a vehicle cabin 20.

Figure 4:
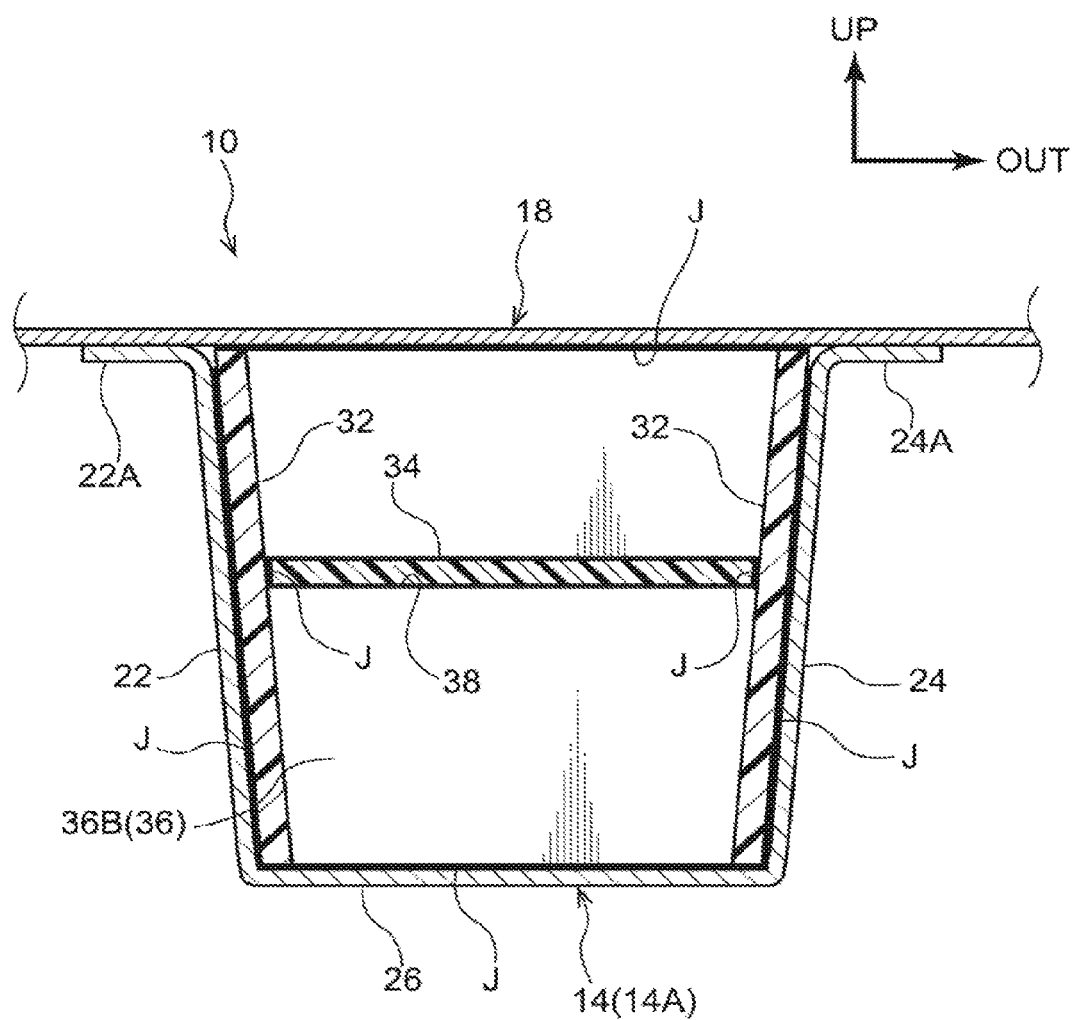
FIG. 4 is a sectional diagram taken along line X-X of FIG. 3.

As shown in FIG. 4, the tilt portion 14A of the front side member 14 is formed in a hat shape in cross section, by an inner wall 22, an outer wall 24 and a lower wall 26 that serve as wall portions. Flange portions 22A and 24A that are formed at an upper end portion of the inner wall 22 and an upper end portion of the outer wall 24, respectively, are joined to a lower face of the dash panel 18. Thus, the tilt portion 14A is constituted with a closed cross section structure.

As shown in FIG. 1, a front side inflection portion 27 and a rear side inflection portion 28 are formed at a front end portion and rear end portion, respectively, of the tilt portion 14A (the rear end portion is a boundary portion with the floor member 15). The front side inflection portion 27 is an inflection portion that is inflected (or curved) so as to project to the vehicle body upper side, and the rear side inflection portion 28 is an inflection portion that is inflected (or curved) so as to project to the vehicle body lower side.

Therefore, when there is a front collision of the vehicle 12 or the like, if a load toward the vehicle body rear side is inputted to the front end portion of the front side member 14, the front side inflection portion 27 deforms to bend toward the vehicle body upper side with a maximum inflection portion (or maximum curvature portion) thereof being a deformation start point, and the rear side inflection portion 28 deforms to bend to the vehicle body lower side with a maximum inflection portion (or maximum curvature portion) L thereof (see FIG. 3) being a deformation start point.

That is, at the front side inflection portion 27, the lower wall 26 side of the front side member 14 acts as a compression deformation side (stress concentration side) wall portion and the dash panel 18 side of the front side member 14 acts as an extension deformation side wall portion. Meanwhile, at the rear side inflection portion 28, the dash panel 18 side of the front side member 14 acts as a compression deformation side (stress concentration side) wall portion and the lower wall 26 side acts as an extension deformation side wall portion.

A reinforcing member 30 is disposed inside the closed cross section structure of the rear side inflection portion 28. The reinforcing member 30 is formed of a fiber-reinforced plastic (FRP) such as, for example, a glass fiber-reinforced plastic (GFRP) or carbon fiber-reinforced plastic (CFRP). The reinforcing member 30 is also disposed in the closed cross section structure at a front side inflection portion of the rear floor side member 16.

Figure 2:
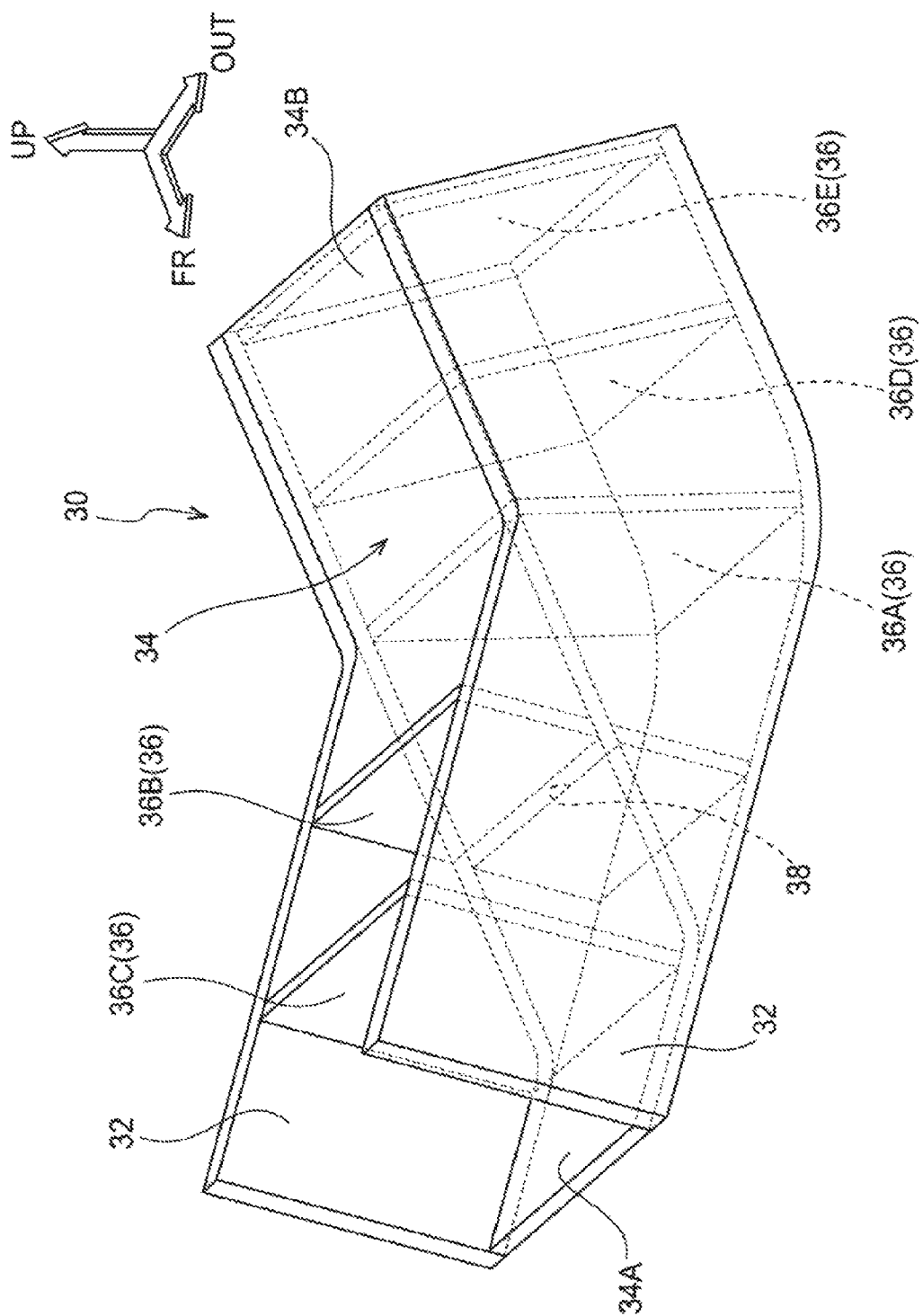
FIG. 2 is a perspective view of a framework member in accordance with the present exemplary embodiment.
Figure 3:
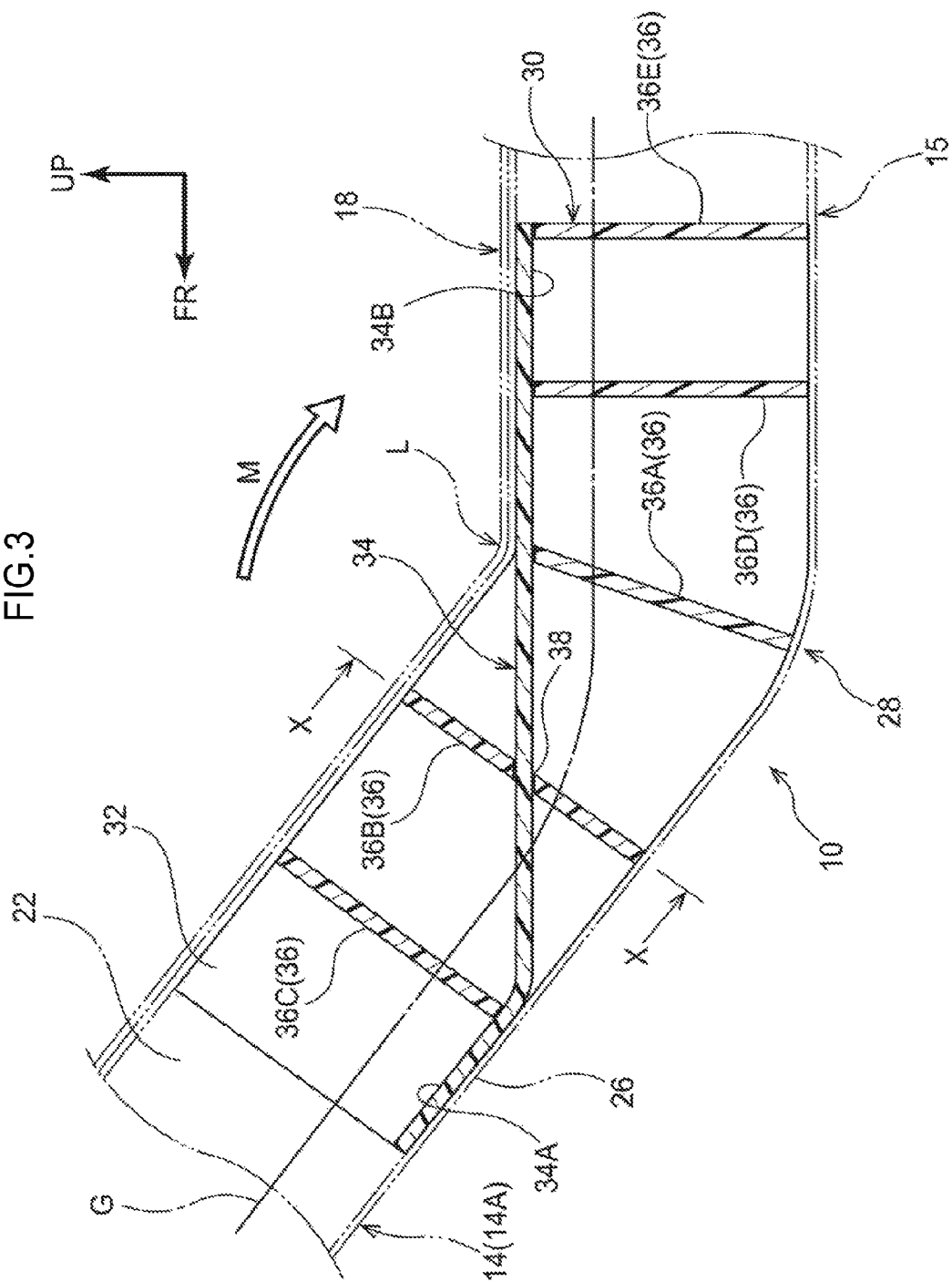
FIG. 3 is a side view of the framework member in accordance with the present exemplary embodiment.

As shown in FIG. 2 and FIG. 3, the reinforcing member 30 includes a pair of mutually opposing side walls 32 and a substantially rectangular flat plate-shaped connecting plate 34. A length direction of each side wall 32 is the extension direction of the front side member 14. A length direction of the connecting plate 34 is the extension direction of the floor member 15. The connecting plate 34 integrally connects the pair of side walls 32. More specifically, two end portions of a short direction of the connecting plate 34 (the vehicle width direction) are joined to inner faces of the side walls 32 by an adhesive J (see FIG. 4).

As shown in FIG. 4, outer faces of the pair of side walls 32 are joined by the adhesive J to an inner face of the inner wall 22 and an inner face of the outer wall 24, respectively, of the rear side inflection portion 28. Thus, the reinforcing member 30 is disposed in the closed cross section structure of the front side member 14. The adhesive J is not shown in the drawings apart from FIG. 4. An adhesive for structural applications with high adhesion strength can be used as the adhesive J in the present exemplary embodiment.

Seen in the direction (the vehicle width direction) in which the side walls 32 are opposing (i.e., in the side view shown in FIG. 3), the side walls 32 are formed in inflected flat plate shapes (or curved flat plate shapes) along the rear side inflection portion 28. Plate thicknesses of the side walls 32 are not particularly limited provided a certain level of strength (stiffness) is provided.

As described above, the connecting plate 34 extends along the length direction of the floor member 15 at the rear side relative to the rear side inflection portion 28. A front end portion 34A of the connecting plate 34 inflects so as to lie along the lower wall 26 of the tilt portion 14A. A lower face of the front end portion 34A is joined to an inner face of the lower wall 26 by the adhesive J. An upper face of a rear end portion 34B of the connecting plate 34 is joined to a lower face of the dash panel 18 by the adhesive J.

Thus, the connecting plate 34 connects the lower wall 26 of the front side member 14, which is the extension deformation side wall portion of the rear side inflection portion 28, with the dash panel 18, which is the compression deformation side wall portion of the rear side inflection portion 28, in the length direction of the floor member 15 (the vehicle body front-and-rear direction).

Figure 5A:
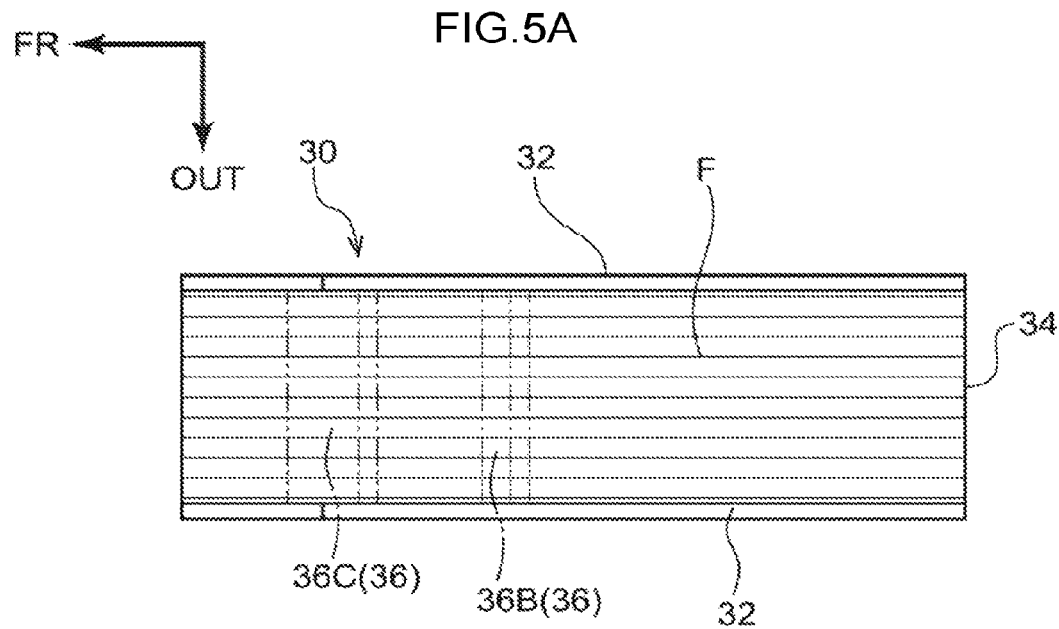
FIG. 5A is a plan view showing an orientation of fibers in a connecting plate of a reinforcing member according to the present exemplary embodiment.

The pair of side walls 32 (including partition walls 36, which are described below) and connecting plate 34 structuring the reinforcing member 30 are respectively fabricated by extrusion molding. For example, the connecting plate 34 is formed by a fiber-reinforced resin being injected through a gate of a die (not shown in the drawings) that is disposed at the center of a rear end portion of the connecting plate 34. Hence, in the plan view shown in FIG. 5A, an orientation of fibers F lies along the extension direction of the connecting plate 34 (i.e., the length direction of the floor member 15).

Figure 5B:
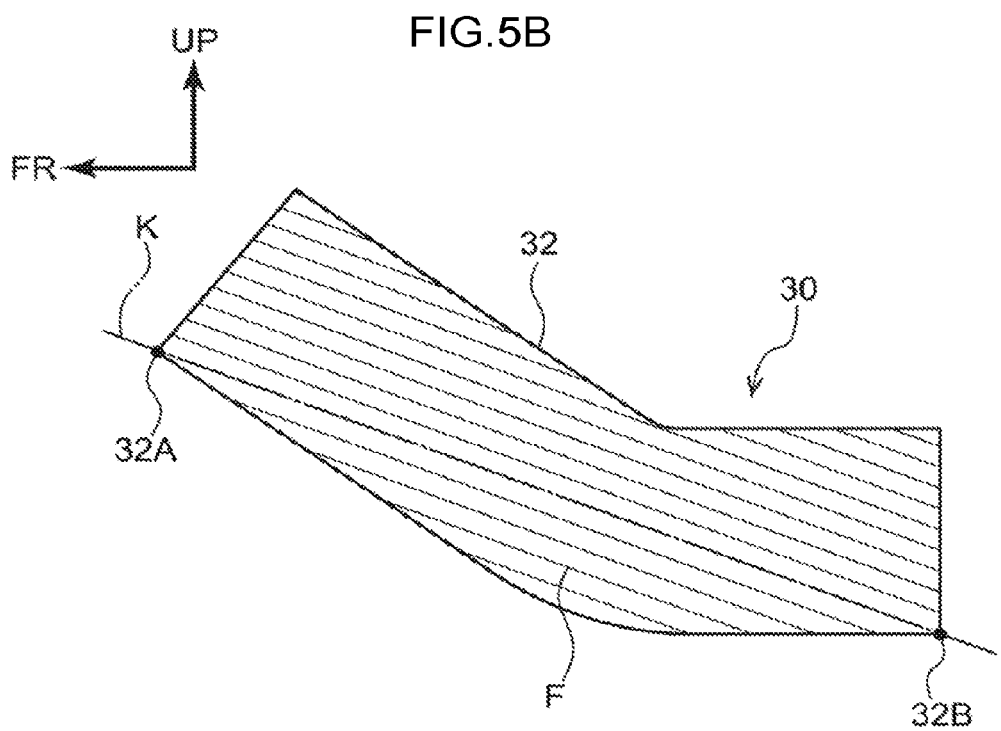
FIG. 5B is a side view showing an orientation of fibers in a side wall of the reinforcing member according to the present exemplary embodiment.

Each side wall 32 is formed by the fiber-reinforced resin being injected through a gate of a die (not shown in the drawings) that is disposed at a rear portion lower end 32B (or a front portion lower end 32A) of the side wall 32. Hence, in the side view shown in FIG. 5B, an orientation of the fibers F is parallel with an imaginary straight line K joining the rear portion lower end 32B with the front portion lower end 32A. In the present exemplary embodiment, the meaning of the term "parallel" includes being substantially parallel, being offset to some extent from precisely parallel.

As shown in FIG. 2 and FIG. 3, the reinforcing member 30 includes a plural number (for example, five) of the partition walls 36, which connect the pair of side walls 32. In the side view shown in FIG. 3, the partition walls 36 are each disposed at an angle that intersects the connecting plate 34 and are spaced apart by predetermined spacings. For example, the partition walls 36 are disposed at angles that are perpendicular to the lower wall 26 and are equally spaced in the length direction of the front side member 14.

The partition walls 36 are formed integrally with the side walls 32. The partition walls 36 have substantially the same height as a height of the side walls 32. An orientation of the fibers F in the partition walls 36 is not particularly limited. A plate thickness of the partition walls 36 is also not particularly limited. For example, the plate thickness of the partition walls 36 may be the same as a plate thickness of the side walls 32 or a plate thickness of the connecting plate 34, and may be a little thinner than the same.

Upper end faces and lower end faces of the partition walls 36, which are not joined to the connecting plate 34 but exposed upward and downward, are joined by the adhesive J to the lower face of the dash panel 18 and the inner face of the lower wall 26, respectively. Thus, as is described below, cross-sectional deformation of the front side member 14 of the rear side inflection portion 28 (particularly deformation causing the lower wall 26 to protrude to the cross section inner side) is suppressed or prevented.

It is desirable if the partition walls 36 are disposed at least at the maximum inflection portion (or maximum curvature portion) L of the rear side inflection portion 28. In the present exemplary embodiment, the meaning of the term "maximum inflection portion (or maximum curvature portion) L" includes positions that are offset to some extent in the front-and-rear direction from the precise maximum inflection portion (or maximum curvature portion). It is also desirable if the partition walls 36 are disposed at the rear end portion side (one length direction end portion side) of the side walls 32. In the illustrated structure, a partition wall 36E is disposed at the rear end portion of the side walls 32.

If the partition walls 36 are provided at these locations, the strength (stiffness) of the reinforcing member 30 is effectively improved. Structures are also possible in which only one of the partition walls 36 is provided at the maximum inflection portion L of the rear side inflection portion 28, and structures are possible in which not even one is provided. The strength (stiffness) of the reinforcing member 30 can be improved in proportion to the number of the partition walls 36.

As shown in FIG. 2 to FIG. 4, a partition wall 36A is disposed at the maximum inflection portion L of the rear side inflection portion 28 and a partition wall 36B is at the front side of the partition wall 36A. A slit portion 38 for insertion of the connecting plate 34 is formed in the partition wall 36B. A partition wall 36C is at the front side relative to the partition wall 36B. A lower end face of the partition wall 36C is joined by the adhesive J to the upper face of the front end portion 34A of the connecting plate 34. A partition wall 36D and the partition wall 36E are at the rear side relative to the partition wall 36A. Upper end faces of the partition walls 36D and 36E are joined by the adhesive J to the lower face of the rear end portion 34B of the connecting plate 34.

Now, operations of the framework member 10 of the vehicle 12 structured as described above are described.

If the vehicle 12 is subject to a front collision (a full-overlap collision, an offset collision or the like) with an obstacle, which is not shown in the drawings, a load from this collision is inputted to the front end portion of the front side member 14 via a front bumper reinforcement, a crush box and the like, which are not shown in the drawings. The rear side inflection portion 28 is a region that is already formed to be inflected (or curved), and the maximum inflection portion L thereof acts as a deformation start point.

However, as described above, the reinforcing member 30 is provided at (the maximum inflection portion L of) the rear side inflection portion 28 of the front side member 14. To be more specific, the reinforcing member 30 is provided inside the closed cross section structure of the rear side inflection portion 28 mainly by the side walls 32 being joined to the inner wall 22 and outer wall 24 of the front side member 14 by the adhesive J.

The front end portion 34A of the connecting plate 34 of the reinforcing member 30 is joined by the adhesive J to the lower wall 26 of the tilt portion 14A of the front side member 14, which is the extension deformation side, and the rear end portion 34B of the connecting plate 34 is joined by the adhesive J to the dash panel 18, which is the compression deformation side (stress concentration side).

Thus, at the rear side inflection portion 28, the connecting plate 34 connects the lower wall 26 of the tilt portion 14A of the front side member 14 with the dash panel 18. Because the reinforcing member 30 (the connecting plate 34) is provided, in the side view shown in FIG. 3, a tilt angle of a centroid G of the tilt portion 14A is a more obtuse angle than if the reinforcing member 30 were not provided.

Therefore, when a load is inputted to the front end portion of the front side member 14 and a bending moment M is inputted to the tilt portion 14A so as to bend the tilt portion 14A with (the maximum inflection portion L of) the rear side inflection portion 28 as a deformation start point (see FIG. 3), a reaction force (a tension force) is produced in the connecting plate 34 of the reinforcing member 30 in response to the front end portion 34A being resiliently deformed upward. Thus, the bending moment M may be dispersed into the floor member 15.

As a result, bending deformation (plastic deformation) of the tilt portion 14A with the rear side inflection portion 28 (i.e., the maximum inflection portion L) as the deformation start point may be suppressed (moderated). That is, according to the reinforcing member 30, a compression force (a negative load) applied to the maximum inflection portion L of the rear side inflection portion 28 may be dispersed and reduced, and therefore the strength (stiffness) of a plastic deformation region of the front side member 14 (the tilt portion 14A) for which the maximum deflection portion L is the deformation start point may be improved (i.e., bending may be made more difficult).

Moreover, because the orientation of the fibers F in the connecting plate 34 is along the extension direction of the connecting plate 34, which is a load input direction (see FIG. 5A), the strength (stiffness) of the connecting plate 34 with respect to an inputted load may be improved compared to a structure in which the orientation of the fibers F is not along the load input direction.

Furthermore, because the orientation of the fibers F in the side walls 32 is parallel to the imaginary straight line K joining the front portion lower end 32A with the rear portion lower end 32B of each side wall 32 and is along the load input direction (see FIG. 5B), the strength (stiffness) of the side walls 32 with respect to an inputted load may be improved compared to a structure in which the orientation of the fibers F is not along the load input direction.

The plural partition walls 36 that integrally connect the pair of mutually opposing side walls 32 in the opposing direction thereof (the vehicle width direction) are formed at the reinforcing member 30. Therefore, cross-sectional deformation of the reinforcing member 30 in this opposing direction may be suppressed or prevented (i.e., buckling resistance of the reinforcing member 30 may be improved), and cross-sectional deformation in which the lower wall 26 at which the reinforcing member 30 is provided protrudes to the cross section inner side (and hence cross-sectional deformation in which the inner wall 22 and outer wall 24 protrude to the cross section outer sides) may be suppressed or prevented by the reinforcing member 30.

Because the partition walls 36 are disposed at angles intersecting the connecting plate 34 (for example, angles perpendicular to the lower wall 26), and the partition walls 36 are disposed at the front end portion 34A side and the rear end portion 34B side of the connecting plate 34, the strength (stiffness) of the front end portion 34A and the rear end portion 34B may be improved, further to which wavelike deformations of the connecting plate 34 may be suppressed or prevented. Hence, a reinforcing effect (stress dispersion effect) from the connecting plate 34 may be improved.

That is, because the partition walls 36 are provided, bending deformation (buckling deformation) of the front side member 14 (the tilt portion 14A) to the vehicle rear side with the rear side inflection portion 28 (the maximum inflection portion L) acting as a deformation start point may be effectively suppressed. If at least the partition wall 36A is disposed at the maximum inflection portion L of the rear side inflection portion 28, bending deformation of the front side member 14 (the tilt portion 14A) with the maximum inflection portion L acting as a deformation start point may be even more effectively suppressed.

Therefore, during a front collision of the vehicle 12, the front side member 14 that is at the vehicle body front side relative to the rear side inflection portion 28 may be effectively compressively deformed (crushed) in the axial direction thereof (the vehicle body front-and-rear direction), and an inputted collision load may be effectively absorbed at the linear region of the front side member 14.

Thus, the rear side inflection portion 28 (a region at which an occurrence of bending deformation is expected to occur) that a load inputted at the front end portion of the front side member 14 acts to bendingly deform may be effectively strengthened locally by the reinforcing member 30. Therefore, a reduction in collision safety performance that is associated with an axial direction compressive deformation failure of the front side member 14 and an increase in a bending deformation amount of the rear side inflection portion 28 may be suppressed or prevented.

Thus, according to the framework member 10 of the vehicle 12 in accordance with the present exemplary embodiment, during a front collision of the vehicle 12, deformation of the vehicle cabin 20 may be suppressed or prevented, and space in the vehicle cabin 20 in the front-and-rear direction may be kept large. Moreover, because the reinforcing member 30 is fabricated of fiber-reinforced resin and is light in weight, fuel consumption may be improved and exhaust gases may be reduced compared to a structure that is reinforced by metal plates or the like.

A reduction in stiffness of the vehicle body may be suppressed and strength (stiffness) of a resilient deformation region of the rear side inflection portion 28 may be improved by this reinforcing member 30. Therefore, vibrations and noise that occur in the vehicle 12 during running of the vehicle 12, and a deterioration in control stability performance of the vehicle 12, may be suppressed or prevented. Similar effects are provided if the reinforcing member 30 is provided at the front side inflection portion of each rear floor side member 16.

Hereabove, the framework member 10 of the vehicle 12 according to the present exemplary embodiment has been described in accordance with the attached drawings. However, the framework member 10 of the vehicle 12 according to the present exemplary embodiment is not limited to the illustrated structure; suitable design modifications may be applied within a scope not departing from the gist of the present invention. As an example, the reinforcing member 30 is not limited to a structure that is joined to the front side member 14 by the adhesive J. For example, a structure is possible that is joined by joining components not shown in the drawings, such as nuts and bolts, rivets or the like.

In particular, it is desirable to use mechanical joining components (that may be securely fixed by fastening) such as nuts and bolts, rivets or the like for joining the front end portion 34A of the connecting plate 34, at which the input of a load is concentrated, to the lower wall 26 of the front side member 14 and for joining the rear end portion 34B of the connecting plate 34 to the dash panel 18. A structure is also possible in which the partition walls 36 are also disposed at the front end portion (a length direction another end portion) of the side walls 32. A further structure is possible in which the connecting plate 34 is molded integrally with the side walls 32 and the partition walls 36.

The reinforcing member 30 may be formed as a structure that is provided in the closed cross section structure of the front side member 14 by insert-molding, pre-preg molding or the like. When the side walls 32 and connecting plate 34 or the like are being molded, as an example, a fiber sheet may be be set in the die beforehand and then molded with a plastic such that the orientation of the fibers F is in the desired direction. Further, the framework member is not limited to being the front side member 14. That is, the reinforcing member 30 may be disposed in a closed cross section structure of any framework member with an inflection portion that is inflected or curved.

The disclosures of Japanese Patent Application No. 2013-165432 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

What is claimed is:

1. A vehicle framework member comprising:
 a framework member with a closed cross section structure including a plurality of wall portions that structure a framework of a vehicle, the framework member including an inflection portion that is inflected or curved at a portion partway along a length direction of the framework member; and
 a reinforcing member fabricated of fiber-reinforced resin, the reinforcing member being disposed in the closed cross section structure at the inflection portion of the framework member,
 the reinforcing member including:
 a pair of side walls formed in inflected flat plate shapes or curved flat plate shapes along the inflection portion;
 a connecting plate that connects the pair of side walls of the reinforcing member and that connects a compression deformation side wall portion of the inflection portion with an extension deformation side wall portion of the inflection portion; and
 at least one partition wall that connects the pair of side walls and is disposed at an angle intersecting the connecting plate.

2. The vehicle framework member according to claim 1, wherein the at least one partition wall is provided at a maximum inflection portion or a maximum curvature portion of the inflection portion.

3. The vehicle framework member according to claim 1, wherein the at least one partition wall is provided at one length direction end portion side of the side walls.

4. The vehicle framework member according to claim 1, wherein an orientation of fibers in the connecting plate is along an extension direction of the connecting plate.

5. The vehicle framework member according to claim 1, wherein an orientation of fibers in each of the side walls is parallel to an imaginary straight line joining one length direction end portion of the side wall at the extension deformation side wall portion with another length direction end portion of the side wall.

6. The vehicle framework member according claim 1, wherein the reinforcing member is joined to a wall portion of the framework member.

* * * * *